United States Patent
Brocke et al.

(10) Patent No.: US 12,099,021 B2
(45) Date of Patent: Sep. 24, 2024

(54) METHOD FOR DETERMINING A DENSITY OF A HARVESTED MATERIAL

(71) Applicant: DEERE & COMPANY, Moline, IL (US)

(72) Inventors: Stefan Brocke, Mannheim (DE); Norbert Fritz, Ilvesheim (DE); Rasika Wagh, Satara (IN); Prashant Koparde, Nimajaga Mal Miraj (IN); Swarupanand Sewalkar, Nagpur (IN)

(73) Assignee: DEERE & COMPANY, Moline, IL (US)

(*) Notice: Subject to any disclaimer, the term of this patent is extended or adjusted under 35 U.S.C. 154(b) by 131 days.

(21) Appl. No.: 18/045,195

(22) Filed: Oct. 10, 2022

(65) Prior Publication Data

US 2023/0184694 A1    Jun. 15, 2023

(30) Foreign Application Priority Data

Dec. 15, 2021 (DE) .......................... 102021133187.0

(51) Int. Cl.
 *G01N 22/04* (2006.01)
(52) U.S. Cl.
 CPC .................................. *G01N 22/04* (2013.01)
(58) Field of Classification Search
 CPC ........ G01N 22/04; G01N 21/31; G01R 33/00; A01D 34/006
 See application file for complete search history.

(56) References Cited

U.S. PATENT DOCUMENTS

| | | | |
|---|---|---|---|
| 7,078,913 B1 * | 7/2006 | Pelletier | G01N 22/04 324/76.56 |
| 7,330,034 B1 * | 2/2008 | Pelletier | G01N 22/04 324/634 |
| 8,742,768 B1 * | 6/2014 | Pelletier | G01N 22/04 324/617 |
| 10,595,459 B2 | 3/2020 | Aposhian et al. | |
| 2021/0321571 A1 | 10/2021 | Brocke et al. | |
| 2022/0146391 A1 | 5/2022 | Von Holst et al. | |

FOREIGN PATENT DOCUMENTS

| | | |
|---|---|---|
| DE | 102017130300 A1 | 6/2019 |
| DE | 102018000148 A1 | 7/2019 |
| DE | 102020110297 A1 | 10/2021 |
| DE | 102020207078 A1 | 12/2021 |
| EP | 0843959 A1 | 5/1998 |
| SE | 1950046 A1 | 7/2020 |
| WO | WO 2019169434 A1 | 9/2019 |

OTHER PUBLICATIONS

European Search Report in application No. EP22197817.4, dated Apr. 14, 2023, 5 pages.

\* cited by examiner

*Primary Examiner* — Jermele M Hollington
*Assistant Examiner* — Taqi R Nasir

(57) ABSTRACT

A method for determining a density of a harvested material includes transmitting radar signals into the harvested material from a transmitting unit, receiving the radar signals reflected by the harvested material by a receiving unit, determining a permittivity of the harvested material as a function of the reflected radar signals via an evaluation unit, and determining the density of the harvested material as a function of the determined permittivity via a signal processing unit.

19 Claims, 2 Drawing Sheets

METHOD FOR DETERMINING A DENSITY OF A HARVESTED MATERIAL

CROSS-REFERENCE TO RELATED APPLICATIONS

This application claims priority to German Patent Application No. 102021133187.0, filed on Dec. 15, 2021, which is hereby incorporated by reference.

FIELD OF THE DISCLOSURE

The disclosure relates to determining a density of a harvested material.

BACKGROUND

DE 10 2020 110 297 A1 includes a sensor which may detect the density of silage using radar waves. The sensor may be attached to the front of a compacting vehicle.

SUMMARY

An object of the present disclosure is determining the density of a harvested material in a technically efficient manner. This object is achieved by one or more of the following methods for determining a density of a harvested material. Further advantageous refinements of the one or more following methods are described herein.

According to an embodiment, a method for determining the density of a harvested material or biomaterial includes one or more of the following. Penetrating radar signals are transmitted into the compacted harvested material from a transmitting unit (e.g., transmitting antenna) of a radar sensor system. The radar signals reflected by the compacted harvested material are received by a receiving unit (e.g., receiving antenna) of the radar sensor system. A permittivity $\epsilon$ of the harvested material is determined as a function of the received (and potentially technically processed) reflected radar signals in an evaluation unit. The density $\rho$ of the harvested material is determined as a function of the permittivity $\epsilon$ in a signal processing unit.

The evaluation unit can comprise specific evaluation electronics. The evaluation unit can form part of the radar sensor system or of the signal processing unit. Alternatively, the evaluation unit can be a functional unit that is physically separate from the radar sensor system and from the signal processing unit.

Once the permittivity $\epsilon$ of the harvested material has been determined, the density of the harvested material can be efficiently determined with low technical effort and high accuracy.

This method for determining a density considerably facilitates compaction work, especially when establishing a silo with a harvested material. For example, the effort for the driver of an agricultural machine (e.g., tractor with or without a separate compaction device) is significantly decreased when repeatedly driving over the silage surface if they want to achieve a target density or setpoint density of the harvested material as precisely as possible.

During compaction work, the currently determined actual density can be compared with a target density (automatically or by the user) while repeatedly carrying out the procedure, so that the actual density of the harvested material approaches the desired target density with optimized effort. This allows stable silage to be produced very efficiently. Consequently, any deterioration in the nutritional content of the silage or nutrient losses are efficiently avoided.

During compaction work, the radar signals need to be transmitted in the direction of the compacted harvested material at least once, automatically or manually (e.g., via an operating interface, an actuating element, etc.). The further method steps for determining the density can be carried out automatically with little technical effort. The signal processing unit contributes to this with one or more corresponding algorithms designed to determine the density.

As already mentioned, a permittivity $\epsilon$ of the harvested material is determined by evaluating the reflected and received radar signals. In turn, the density $\rho$ of the harvested material is determined from the permittivity $\epsilon$, for example by means of specific mathematical correlations and corresponding algorithms. Various variables influencing the permittivity $\epsilon$ (e.g., moisture content of the harvested material, current ambient temperature) can be taken into account in this case.

To determine the permittivity $\epsilon$, reflected and received radar signals are taken into account, for example with regard to different signal propagation times of the radar signals, different frequency components and different signal amplitudes at different reflecting material depths of the harvested material.

To determine the density $\rho$, the following relationships are taken into account. The permittivity $\epsilon$ can, as a complex quantity $\epsilon=\epsilon'+j\epsilon''$, be divided into a real part $\epsilon'=a\rho^2+b\rho+1$ and an imaginary part $\epsilon''=c\rho^2+d\rho$. The factors a, b, c, d are material parameters of the harvested material which can be determined empirically, for example, by way of prior calibration measurements (especially with a known density $\rho$). Proceeding from these real and imaginary parts, it is possible to mathematically solve for the density $\rho$ according to the following equation.

$$\rho = \frac{\alpha_f \epsilon' - \epsilon''}{\alpha_f k}$$

The factor $\alpha_f$ is dependent on the aforementioned factors a, b, c, d and is also a frequency-dependent factor with regard to the radar signals used. In addition, the factor $\alpha_f$ is constant for a given biomaterial or harvested material. The quantity k is likewise constant for a given biomaterial or harvested material. The values of both of these values can, for example, be available as calibration data.

According to the method, radar technology is used to determine the density. For example, wideband technology (UWB) is used so that more information can be processed regarding the form and material of the surfaces reflecting the radar signals in their depth. For example, a frequency band from approx. 100 MHz to 10 GHz is used. For example, a frequency range of about 6 to 8 MHz is evaluated for determining the density $\rho$.

The agricultural machine is, for example, a tractor with or without a compaction device for compacting the harvested material. The vehicle tires of the tractor can, for example, serve as the compaction device. Alternatively, or additionally, a separate compaction device (e.g., compactor, silage roller) coupled to the tractor can be provided.

In some embodiments, the received reflected radar signals are first converted in a technically suitable manner into signals which represent the permittivity $\epsilon$ and are then available as input signals for the signal processing unit or are received as input signals by the signal processing unit. This keeps the technical effort for determining the density relatively low. The processing and conversion of the reflected radar signals into input signals for the signal processing unit is already carried out in the evaluation unit as part of the radar sensor system, which is connected to a signal input of the signal processing unit.

In addition to the aforementioned input signals, the signal processing unit receives further signals or data, which aids accuracy in determining the density. For example, these data represent at least one of the following parameters or characteristics: an item of calibration information, an ambient temperature, a moisture content of the harvested material, and an item of information characterizing the harvested material.

The calibration information includes, for example, previously known characteristic curves (e.g., relationship between permittivity $\epsilon$ and density $\rho$ for constant moisture content of the harvested material) or values for individual constants and parameters determined by means of calibration measurements.

The received ambient temperature contributes to a technically straightforward determination of a moisture content of the harvested material. In turn, the moisture content can, depending on the signal processing, be taken into account in the signal processing unit for determining the density and/or be valuable additional information for the user for efficient compaction work. The moisture content is defined as the ratio of the mass of water to the total mass of the harvested material.

Information characterizing the harvested material or biomaterial includes, for example, information about the plant species (e.g., grass, maize, cereal) or the respective variety or its state of growth. Another item of information is, for example, a cutting length or chop length of the harvested material.

In some embodiments, the aforementioned data are at least partially sent to the signal processing unit from an operating interface of a work device (e.g., agricultural machine, mobile terminal) and/or from at least one data source. Thus, transmission of the data to the signal processing unit can be carried out partially or fully automatically with little technical effort, which further decreases effort for the user (e.g., as the driver of the work machine) during compaction work.

The aforementioned data source is, for example, an external data center which communicates via a radio link with the signal processing unit or with a control unit including the signal processing unit. In another embodiment, the data source comprises a data storage device and is physically arranged in or on a work device (e.g., agricultural machine, mobile terminal). Here, the data transmission between the data source and the signal processing unit is by wire or cable.

In some embodiments, the signal processing unit issues output signals representing the determined density $\rho$. These output signals can be signaled (if necessary, in converted form) to the user in a suitable way, for example by means of a visual (e.g., screen, display) and/or acoustic unit. This signaling can include, for example, numerical values, a visual progress bar or multi-colored bar indicating a target density, or a voice output.

In an additional function, the signal processing unit can be used to issue output signals representing a moisture content W of the harvested material based on processing of data (e.g., the current ambient temperature) even without knowledge of the current moisture content of the harvested material. These output signals can also be signaled to a user in a suitable manner, as already explained. The signaling of the moisture content efficiently assists the user in assessing the harvested material during compaction work.

To determine the moisture content W, the following relationships are taken into account. The moisture content W can be calculated from the following equation.

$$W = b_1 \psi + b_2 T + b_3$$

Here T is the aforementioned ambient temperature and b1, b2, b3 are constants. The values of these constants can be made available as calibration data, for example. The quantity $\psi$ can be defined as the following equation.

$$\psi = \sqrt{\frac{\epsilon''}{\epsilon'(\alpha_f \epsilon' - \epsilon'')}}$$

Since the values of all of the quantities contained in the equation are known by virtue of the relationships described above, the value of the quantity $\psi$ can also be calculated.

The method for determining the density is carried out by means of a suitable technical arrangement. This arrangement includes at least one transmitting unit of a radar sensor system for transmitting radar signals that penetrate into the harvested material, a receiving unit of a radar sensor system for receiving the radar signals reflected by the harvested material, an evaluation unit for determining a permittivity $\epsilon$ of the harvested material and a signal processing unit for determining the density $\rho$ of the harvested material as a function of the permittivity $\epsilon$.

The transmitting unit for the transmitted radar signals and the receiving unit for the received reflected radar signals form part of the radar sensor system, which contributes to a compact design of the arrangement for carrying out the method.

In another embodiment, the signal processing unit forms part of a control unit or forms this control unit. The control unit controls the determination of the density of the harvested material. The control unit (e.g., a controller) includes typical functional units such as a microprocessor unit, a memory unit, etc. and can support automated and efficient execution of the method in terms of control technology. For example, the control unit can control the activities of the transmitting unit and of the receiving unit, as well as the communication with the aforementioned operating interface and/or data source.

The control unit can also be used to control a work-related function during compaction work as a function of the determined density and/or as a function of the determined moisture content W. This is, for example, density-dependent signaling of further specific information for the user. In another embodiment, the work-related function is a vehicle or machine function of the agricultural machine. In this case, the control unit can adjust further compaction work depending on the determined density and/or the determined moisture content, e.g., control the driving speed by controlling the engine control unit or control the compaction strength of a compaction device coupled to the work machine. By repeatedly determining the density and optionally the moisture content, the compaction work can be precisely readjusted by means of the control unit. This readjustment is carried out, for example, by way of automated (and possibly repeated) comparison of the determined current actual density with a predetermined target density. When a predetermined difference between the actual density and the target density is reached or not exceeded, the compaction work can then be stopped.

In some embodiments, the arrangement for carrying out the method is used in an agricultural machine. The arrangement for carrying out the method can be coupled with low technical effort to an operating interface (e.g. screen, keyboard) of the work machine and/or to a position detection system (e.g. GPS) of the work machine and/or to a bus system (e.g. CAN) of the work machine and/or to an external data source for signals/data. The aforementioned control unit of the arrangement serves as a signal/data interface for the coupling.

The arrangement for carrying out the method, for example the radar sensor system, is mounted at a suitable location on the work machine so that the density of the harvested material can be determined automatically and continuously during the compaction work by the moving work machine.

Alternatively, the arrangement can be used to perform the method in a portable or mobile terminal. This allows the user to take individual manual measurements of the density and optionally also of the moisture content of the harvested material during compaction work.

The above and other features will become apparent from the following detailed description and accompanying drawings.

BRIEF DESCRIPTION OF THE DRAWINGS

The method according to the disclosure and an arrangement for carrying out the method will be explained in more detail below with reference to the accompanying drawings.

Functionally equivalent or comparable components here are provided with the same reference signs. In the drawings.

DETAILED DESCRIPTION

The embodiments or implementations disclosed in the above drawings and the following detailed description are not intended to be exhaustive or to limit the present disclosure to these embodiments or implementations.

Figure 1:
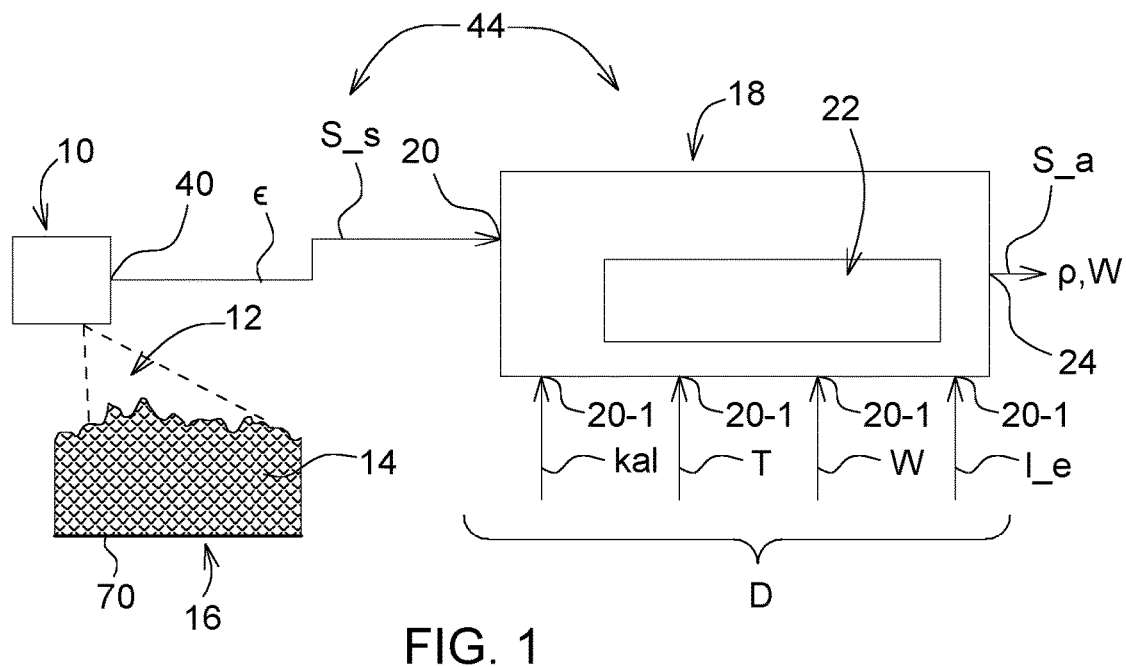
FIG. 1 shows a schematic representation of a radar-based signal processing for determining a density of a harvested material.

FIG. 1 shows a radar sensor system 10 for transmitting and receiving radar signals within a transmission and reception area 12. Radar signals are transmitted in the direction of a biomaterial or harvested material 14, which is stored in a silo 16. Depending on a determined density ρ of the harvested material 14, it is either further compacted or the compaction work is ended.

To determine the density ρ of the harvested material 14, the sensor system 10 first generates specific sensor signals S_s based on the transmitted and received radar signals. The sensor signals S_s are received by a signal processing unit 18 at a signal input 20. The sensor signals S_s or signals derived therefrom are processed together with additional data D in one or more specific algorithms 22. The result of this signal processing is issued at a signal output 24 of the signal processing unit 18 as output signals S_a. Issued output signals S_a represent, for example, the density ρ or a moisture content W of the harvested material 14.

The data D received by the signal processing unit 18 at one or more additional signal inputs 20-1 comprise, for example, at least one of the following items of information or quantities: an item of calibration information kal, an ambient temperature T, a moisture content W of the harvested material 14, and an item of information I_e characterizing the harvested material 14.

The aforementioned information or quantities can be partly retrieved from data sources or they can be provided by measurements. As already mentioned, not all of the aforementioned information or quantities necessarily have to be available to the signal processing unit 18. For example, the moisture content W and the information I_e characterizing the harvested material 14 are information which is optionally received by the signal processing unit 18. Furthermore, the data D can optionally also contain other information or quantities not mentioned here.

To determine the density ρ and the moisture content W, the following mathematical-physical relationships are taken into account in the signal processing unit 18 or in its algorithms 22:

The disclosure is based on the idea that a permittivity $\epsilon$ of the harvested material 14 can be determined by processing radar signals reflected off the harvested material 14. The permittivity $\epsilon$ is dependent on the moisture content W. To take this dependency into account, the permittivity $\epsilon$ is, as a complex quantity $\epsilon = \epsilon' + j\epsilon''$, divided into a real part $\epsilon' = a\rho^2 + b\rho + 1$ and an imaginary part $\epsilon'' = c\rho^2 + d\rho$. The factors a, b, c, d are material parameters of the harvested material 14 which can be determined empirically, for example, by way of prior calibration measurements (especially with a known density ρ).

Proceeding from these real and imaginary parts, it is possible to mathematically solve for the density ρ according to the following equation.

$$\rho = \frac{\alpha_f \epsilon' - \epsilon''}{\alpha_f k}$$

The factor $\alpha_f$ is dependent on the aforementioned factors a, b, c, d and is also a frequency-dependent factor with regard to the radar signals used. In addition, the factor $\alpha_f$ is constant for a given biomaterial or harvested material 14. The quantity k is likewise constant for a given biomaterial or harvested material 14. The values of both of these quantities can, for example, be retrievable from a memory unit of the signal processing unit 18 or be communicated via the information kal or I_e of the signal processing unit 18. Thus, the density ρ can also be determined without knowledge of the current moisture content W.

The aforementioned relationships make it possible, with relatively little computational effort in the signal processing unit 18, to also determine the moisture content W in parallel with determining the density ρ. The moisture content W can be calculated from the following equation.

$$W = b_1 \psi + b_2 T + b_3$$

Here T is the aforementioned ambient temperature and b1, b2, b3 are constants. The values of these constants can, for example, be retrievable from a memory unit of the signal processing unit 18 or be communicated via the information kal or I_e of the signal processing unit 18.

The quantity ψ can be defined as the following equation.

$$\psi = \sqrt{\frac{\epsilon''}{\epsilon'(\alpha_f \epsilon' - \epsilon'')}}$$

Since the values of all of the quantities contained in the equation are known by virtue of the relationships described above, the value of the quantity ψ can also be calculated.

Figure 2:
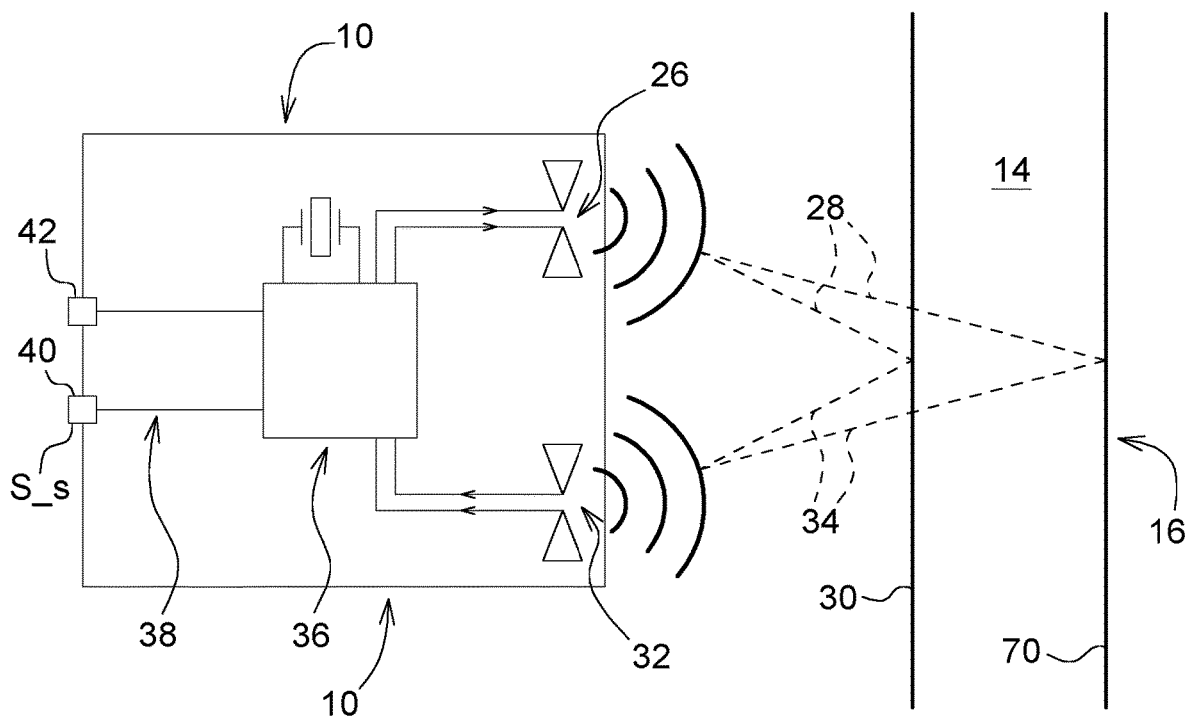
FIG. 2 shows a schematic representation of a radar sensor system for determining the density of the harvested material.

FIG. 2 shows one exemplary embodiment of the radar sensor system 10. Radar signals 28 are transmitted from a transmitting unit 26 of the sensor system 10 in the direction of the harvested material 14. A portion of the radar signals 28 impinges on a surface 30 of the harvested material 14 (shown schematically as a straight line) and is reflected there. Other portions of the radar signals 28 penetrate deeper into the harvested material 14 and are reflected there. Still other portions of the radar signals 28 are reflected off a boundary surface of the silo 16 (e.g., off a silo base plate 70). A receiving unit 32 of the sensor system 10 receives the reflected radar signals 34. The received radar signals 34 are processed in an evaluation unit in the form of electronics 36 of the sensor system 10. From this processing or signal conversion, the electronics 36 generate signals that are transmitted through one or more internal signal lines 38 to a sensor connection 40, where they are available as sensor signals S_s. The sensor signals S_s are then received as input signals by the signal processing unit 18. The sensor signals S_s can represent the permittivity ϵ.

The electronics 36 are supplied with electrical power via an electrical voltage connection 42.

The sensor system 10 and the signal processing unit 18 form parts of a technical arrangement 44 for determining the density ρ and optionally the moisture content W of the harvested material 14. The arrangement 44 may be supplemented with different functional units and have different purposes.

Figure 3:
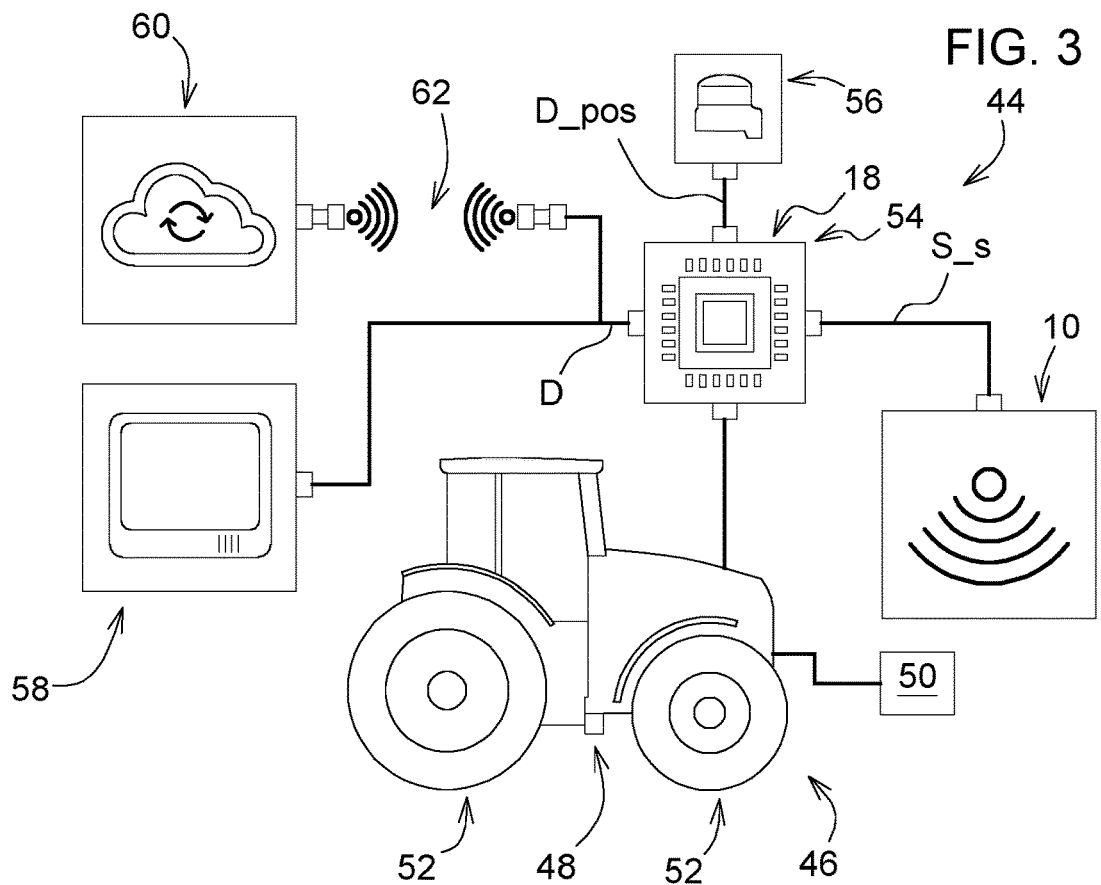
FIG. 3 shows a schematic block diagram of functional units for an agricultural machine for carrying out the method according to the disclosure.

In FIG. 3, the arrangement 44 is integrated into an agricultural machine 46. The latter comprises a tractor 48 and a compaction device 50 coupled at the front thereof. The compaction device 50 is shown schematically as a block, which is representative of different embodiments, e.g., a silage compaction roller. Even though the compaction device 50 in FIG. 1 is mounted at the front of the tractor 48, rear-mounted compaction devices 50 are also conceivable in alternative or supplementary variants. In another variant, the tractor 48 can also be without a separate compaction device 50 and perform the compaction work by means of its tires 52. In other embodiments, the tractor 48 can be replaced by another suitable self-propelled vehicle.

A control unit 54 integrated into the work machine 46, more precisely into the tractor 48 in this exemplary embodiment, includes the signal processing unit 18 or forms the signal processing unit 18. Thus, the control unit 54 forms part of the arrangement 44. The signal processing unit 18 receives various data D for data processing via the control unit 54, for example for determining the density ρ and possibly also the moisture content W. Optionally, the control unit 54 or the signal processing unit 18 also receives position data D_pos from a position detection system 56 (e.g., GPS) of the work machine 46.

The data D can be specified manually by an operating interface 58 (e.g., visual display unit, screen, input unit, etc.) integrated into the tractor 48, for example, and/or can be made available to the control unit 54 or to the signal processing unit 18 from an external data source 60 (e.g. external data/computer center) via a wireless data connection 62 (e.g. mobile communications).

The control unit 54 supports automated execution of the method so that the density ρ and, where applicable, the moisture content W are determined in a controlled manner by the control unit 54.

Furthermore, the control unit 54 can also be used to control a work-related function during compaction work, for example a vehicle or machine function of the work machine 46, as a function of the determined density ρ and/or as a function of the determined moisture content W. In this case, the control unit 54 can adjust further compaction work depending on the determined density ρ and/or the determined moisture content W, e.g., by controlling the driving speed of the tractor 48 or by controlling the compaction strength of the compaction device 50 coupled to the tractor 48.

Figure 4:
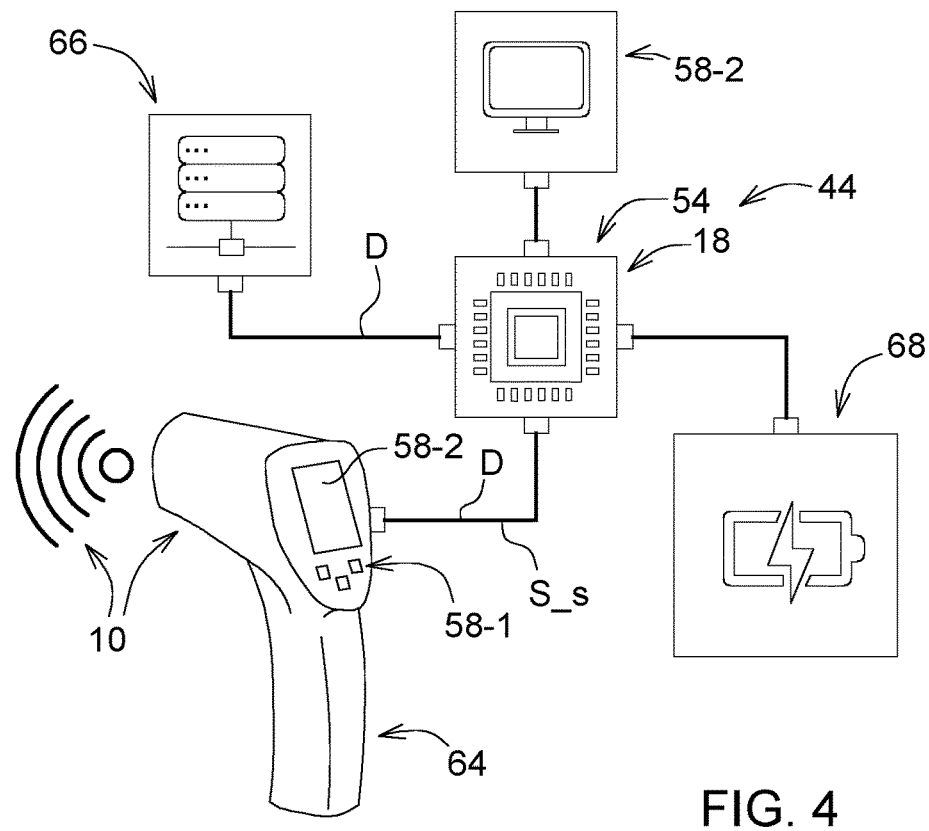
FIG. 4 shows a schematic block diagram of functional units for a mobile terminal for carrying out the method according to the disclosure.

In FIG. 4, the arrangement 44 is integrated into a mobile, portable terminal 64. In this embodiment, the operating interface 58 has multiple function buttons 58-1 (e.g., for the on/off, start, save functions) and a visual display unit 58-2 (e.g., LCD display).

In this embodiment, the data D can be manually specified by the function buttons 58-1 and/or can be provided by a data storage device 66 as a data source for the control unit 54 or the signal processing unit 18. Here, the data storage device 66 forms part of the arrangement 44 within the terminal 64.

As already described, the sensor signals S_s from the sensor system 10 are also forwarded to the control unit 54 or to the signal processing unit 18 in the case of the terminal 64.

An energy storage device 68 (e.g., battery, accumulator) integrated into the terminal 64 supplies the electrical or electronic components (such as the sensor system 10 and the control unit 54) of the terminal 64 with electrical power.

The schematic details shown in the drawings are not necessarily to scale.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for determining a density of a harvested material, comprising:
   transmitting radar signals into the harvested material from a transmitting unit;
   receiving the radar signals reflected by the harvested material by a receiving unit;
   determining a permittivity of the harvested material as a function of the reflected radar signals via an evaluation unit;
   determining the density of the harvested material as a function of the determined permittivity via a signal processing unit;
   performing compaction work on the harvested material; and
   during compaction work, adjusting, via an electronic control unit, subsequent compaction work based on the density determination of the signal processing unit.

2. The method of claim 1, wherein the received reflected radar signals are converted into signals which represent the determined permittivity and are received as input signals by the signal processing unit.

3. The method of claim 1, wherein the signal processing unit receives data which represent at least one of the following items of information: an item of calibration information, an ambient temperature, a moisture content of the harvested material, and an item of information characterizing the harvested material.

4. The method of claim 3, wherein the data are at least partially transmitted from one or more of an operating interface and a data source to the signal processing unit.

5. The method of claim 1, wherein the signal processing unit issues output signals which represent the determined density to the electronic control unit.

6. The method of claim 1, wherein the signal processing unit issues output signals which represent a moisture content of the harvested material.

7. The method of claim 1, further comprising:
   performing the compaction work by driving an agricultural vehicle over the harvested material;
   wherein the transmitting unit and the receiving unit are mounted to the agricultural vehicle having a compaction device for performing the compaction work on the harvested material;
   wherein the step of adjusting the subsequent compaction work via the electronic control unit includes one or both of controlling a driving speed of the agricultural vehicle or controlling a compaction strength of the compaction device.

8. The method of claim 1, further comprising:
   transmitting and receiving the radar signals on the same side of the harvested material such that a transmission path of the transmitted radar signals and a reflection path of the received reflected radar signals define a transmission and reception area on one side of the harvested material.

9. The method of claim 8, further comprising:
   performing the compaction work via an agricultural vehicle while transmitting and receiving the radar signals via the agricultural vehicle;
   wherein the transmitting unit and the receiving unit are mounted to the agricultural vehicle having a compaction device for performing the compaction work on the harvested material.

10. The method of claim 8, further comprising:
    transmitting and receiving the radar signals via a portable hand-held terminal;
    wherein the transmitting unit and the receiving unit are mounted to the portable hand-held terminal.

11. An arrangement for determining a density of a harvested material, the arrangement comprising:
    a transmitting unit which transmits penetrating radar signals into the harvested material;
    a receiving unit which receives radar signals reflected by the harvested material;
    an evaluation unit which determines a permittivity of the harvested material as a function of the received reflected radar signals;
    a signal processing unit which determines the density of the harvested material as a function of the determined permittivity; and
    an electronic control unit that, during compaction work on the harvested material, adjusts subsequent compaction work based on the density determination of the signal processing unit.

12. The arrangement of claim 11, wherein the electronic control unit includes the signal processing unit for determination of the density of the harvested material.

13. The arrangement of claim 11, wherein a radar sensor system includes the transmitting unit, the receiving unit, and the evaluation unit for determination of the permittivity of the harvested material.

14. The arrangement of claim 11, wherein the arrangement is integrated into a work machine.

15. The arrangement of claim 11, wherein the arrangement is integrated into a portable hand-held terminal.

16. The arrangement of claim 11, wherein the transmitting unit and the receiving unit are mounted to an agricultural vehicle having the electronic control unit and a compaction device for performing the compaction work on the harvested material.

17. The arrangement of claim 16, wherein the electronic control unit adjusts the subsequent compaction work based on the density determination of the signal processing unit by one or both of controlling a driving speed of the agricultural vehicle or controlling a compaction strength of the compaction device.

18. The arrangement of claim 11, wherein the transmitting unit is disposed on the same side of the harvested material as the receiving unit such that a transmission path of the transmitted radar signals and a reflection path of the received reflected radar signals define a transmission and reception area on one side of the harvested material.

19. The arrangement of claim 18, further comprising:
    an agricultural vehicle having the transmitting unit and the receiving unit mounted thereto, the agricultural vehicle having a compaction device for performing the compaction work on the harvested material;

wherein the electronic control unit adjusts the subsequent compaction work based on the density determination of the signal processing unit by one or both of controlling a driving speed of the agricultural vehicle or controlling a compaction strength of the compaction device.

* * * * *